(12) United States Patent
Kitamura et al.

(10) Patent No.: US 7,487,162 B2
(45) Date of Patent: Feb. 3, 2009

(54) METHOD AND DATA PROCESSING SYSTEM WITH DATA REPLICATION

(75) Inventors: Kenichi Kitamura, Yokohama (JP); Mitsuo Miyazaki, Zushi (JP); Kota Yamaguchi, Yamato (JP); Hiroshi Yamakawa, Yokohama (JP)

(73) Assignees: Hitachi, Ltd., Tokyo (JP); Hitachi Software Engineering Co., Ltd., Yokohama-shi (JP)

( * ) Notice: Subject to any disclaimer, the term of this patent is extended or adjusted under 35 U.S.C. 154(b) by 272 days.

(21) Appl. No.: 10/781,677

(22) Filed: Feb. 20, 2004

(65) Prior Publication Data

US 2004/0215637 A1 Oct. 28, 2004

(30) Foreign Application Priority Data

Apr. 11, 2003 (JP) ............................. 2003-108361

(51) Int. Cl.
*G06F 7/00* (2006.01)
(52) U.S. Cl. ....................... 707/100; 707/202
(58) Field of Classification Search ................ 709/225, 709/100; 395/489; 707/1, 100, 202
See application file for complete search history.

(56) References Cited

U.S. PATENT DOCUMENTS

| | | | |
|---|---|---|---|
| 5,287,496 A | | 2/1994 | Chen et al. |
| 5,317,731 A | | 5/1994 | Dias et al. |
| 5,596,706 A | | 1/1997 | Shimazaki et al. |
| 5,742,792 A | * | 4/1998 | Yanai et al. ................. 711/162 |
| 5,812,849 A | * | 9/1998 | Nykiel et al. ............... 717/101 |
| 6,023,707 A | | 2/2000 | Hamada et al. |
| 6,567,811 B1 | * | 5/2003 | Edwards et al. ............. 707/100 |
| 6,654,752 B2 | | 11/2003 | Ofek |
| 6,665,812 B1 | * | 12/2003 | Blumenau et al. ............... 714/5 |
| 6,681,290 B2 | * | 1/2004 | Brower et al. ............... 711/114 |
| 6,691,245 B1 | * | 2/2004 | DeKoning ...................... 714/6 |
| 6,757,698 B2 | * | 6/2004 | McBride et al. ............. 707/204 |
| 6,829,623 B2 | | 12/2004 | Tsuchida et al. |
| 6,912,629 B1 | * | 6/2005 | West et al. .................. 711/161 |
| 7,117,197 B1 | * | 10/2006 | Wong et al. ..................... 707/3 |

(Continued)

OTHER PUBLICATIONS

Bal et al., "Performance Evaluation of the Orca Shared-Object System"[online], Feb. 1998, P 1-40 [retrieved on Oct. 23, 2008]. Retrieved from the Internet: <URL: <http://delivery.acm.org/10.1145/280000/273014/p1-bal.pdf?key1=273014&key2=1426774221&coll=ACM&dl=ACM &CFID=773447 1&CFTOKEN =90681475>.*

*Primary Examiner*—John E Breene
*Assistant Examiner*—Dennis Myint
(74) *Attorney, Agent, or Firm*—Mattingly, Stanger, Malur & Brundidge, P.C.

(57) ABSTRACT

There is provided a technique capable of executing a predetermined processing while continuing a database processing. Firstly, the database to be operated is switched from the main database to a duplicate database. The predetermined processing is executed to the main database which becomes the non-operation mode by the switching. Next, a database access request is distributed to the duplicate database which becomes the operation mode by the switching, thereby performing the database processing. Update information indicating the content of the update processing performed to the duplicate database is output. The output update information is reflected on the main data base for which the predetermined processing has been executed. After this, the database to be operated is switched from the duplicate database to the main database.

3 Claims, 10 Drawing Sheets

U.S. PATENT DOCUMENTS

| | | | |
|---|---|---|---|
| 7,263,689 B1* | 8/2007 | Edwards et al. | 717/127 |
| 2002/0198899 A1 | 12/2002 | Yamaguchi et al. | 707/200 |
| 2003/0065780 A1* | 4/2003 | Maurer et al. | 709/225 |
| 2003/0135478 A1* | 7/2003 | Marshall et al. | 707/1 |
| 2003/0163510 A1* | 8/2003 | Janssen | 709/100 |

* cited by examiner

FIG.10

EXAMPLE OF UPDATE INFORMATION RECORD FORMAT

| REGION NAME | TABLE NAME | KEY VALUE | PROCESSING TYPE | UPDATE DATA |
|---|---|---|---|---|
| a | table 1 | 0105 | ADD | ADDITION DATA INFORMATION |
| a | table 1 | 0021 | UPDATE | UPDATING DATA INFORMATION |
| a | table 1 | 0003 | DELETE | — |
| ⋮ | ⋮ | ⋮ | ⋮ | ⋮ |

FIG.11

| | PROCESS NUMBER | PROCESSING MODE | UPDATE INFORMATION |
|---|---|---|---|
| #1 | 03 | busy | UPDATE INFORMATION ON UPDATE PROCESSING |
| | ⋮ | ⋮ | |
| #REMAINDER OF (KEY VALUE/n) + 1 | | | |
| | 30 | ready | UPDATE INFORMATION ON ADDITION PROCESSING |
| #n | ⋮ | ⋮ | | ically reflected from the main volume

METHOD AND DATA PROCESSING SYSTEM WITH DATA REPLICATION

CROSS-REFERENCE TO RELATED APPLICATION

This application relates to and claims priority from Japanese Patent Application No. 2003-108361, filed on Apr. 11, 2003, the entire disclosure of which is incorporated herein by reference.

BACKGROUND OF THE INVENTION

The present invention relates to a database processing technique used in operation of a database.

The online business performing the conventional large amount of transaction processing requires daily, weekly, and monthly processing such as a large amount data calculation and batch registration or a periodical batch processing such as database backup and re-organization. Since these processes are accompanied by batch access of a database used by the online service, the online business is greatly affected by it and it disturbs provision of 24-hour continuous service (function realized by execution of a program and an object).

Recently, the SAN (Storage Area Network) configuration organically connecting a plurality of storage devices such as magnetic disc devices by a dedicated high-speed network is in widespread use. In this configuration, the storage device provides a function of high-speed copying of an arbitrary logical volume to a plurality of logical volumes, a function of data multiple writing by making an arbitrary logical volume a main volume and the other plurality of logical volumes sub-volumes, a function of disconnecting the logical volume in the multiple write mode at an arbitrary moment and accessing the main volume and the sub-volumes independently of each other, and a difference reflection function for making an arbitrary volume a main volume and another logical volume a sub-volume and resuming the multiple write so that only a difference between the data is reflected from the main volume to the sub-volume.

Moreover, a duplicate database access device has been suggested in U.S. patent application Publication No. 2002/0198899A1. When one of the database areas multiple-written or duplicated by the external storage device is disconnected and a physical duplicate database is created, it is possible to maintain consistency of the duplicate database while continuing the transaction processing and to access a plurality of physical databases without modifying the application program which has been accessing the duplicate origin database.

SUMMARY OF THE INVENTION

In the aforementioned conventional technique, a duplicate of a database is created as a duplicate database. When the database should be subjected to a predetermined processing such as reorganization and fragmentation, the object to be operated is switched to the duplicate database. When database processing is continued by the duplicate database even when reorganizing the database, update processing performed to the duplicate database should also be performed to the database after reorganization. However, in order to realize it, the update processing for the duplicate database should be reflected in time series to the database. Update processes performed by a plurality of programs such as a business program and an application program cannot be easily re-executed in time series by the aforementioned program. This has been difficult to be realized by other than the database managing side.

It is therefore an object of the present invention to solve the aforementioned problem and provide a technique capable of executing a database processing and a predetermined processing in parallel and concurrently when the predetermined processing should be performed to the database.

According to the present invention, an object to be operated is switched to a duplicate database so that database processing is continued and a predetermined processing is executed to a main database. After the update processing performed to the duplicate database is reflected on the main database, the object to be operated is returned to the main database.

In the database processing device (computer, information processing device, or program and object which perform the processing) according to the present invention, when execution of a particular processing such as reorganization of the main database is instructed as an operation instruction, execution of the database processing for the main database as an object to be operated is stopped and the main database and its duplicate database are set to the quiescent mode. By modifying the status in the DB definition information, the database to be operated is switched from the main database to the duplicate database, after which the quiescent mode of the main database and the duplicate database is released.

Next, a predetermined processing such as reorganization is performed to the main database which has become non-object to be operated by the status modification and a database access request is distributed to the duplicate data base which has become an object to be operated by the status modification so as to continue database processing. Update information indicating the content of update processing performed to the duplicate database is output to the update information file.

When the predetermined processing to the main database is complete, the content of the main database is updated according to the update information output, thereby reflecting the update information on the main data base. During this time, a business processing is continuously executed in the duplicate database and the update processing amount requiring reflection increases. However, since the update reflection processing executes update processing based on the update information in parallel, it is possible to execute at a higher speed than update by business and can catch up with the business processing.

When the reflection of the update information is complete, execution of the database processing to the duplicate database as an object to be operated is stopped and the main database on which the update information is reflected and the duplicate database as an object to be operated are set to the quiescent mode. By modifying the status in the DB definition information, the database to be operated is switched from the duplicate database to the main database, after which the stilled mode of the main database and the duplicate database is released and the database processing by the main database is resumed.

As has been described above, in the database processing device according to the present invention, when a predetermined processing should be performed to the main database, the predetermined processing can be executed while continuing the database processing.

Other objects, features and advantages of the invention will become apparent from the following description of the embodiments of the invention taken in conjunction with the accompanying drawings.

BRIEF DESCRIPTION OF THE DRAWINGS

FIG. 10 shows an example of update information record format according to the present embodiment.

FIG. 11 shows an example the execution process management table format of the update reflection process according to the present embodiment.

DESCRIPTION OF THE EMBODIMENTS

Description will now be directed to a database processing system according to an embodiment of the present invention.

Figure 1:
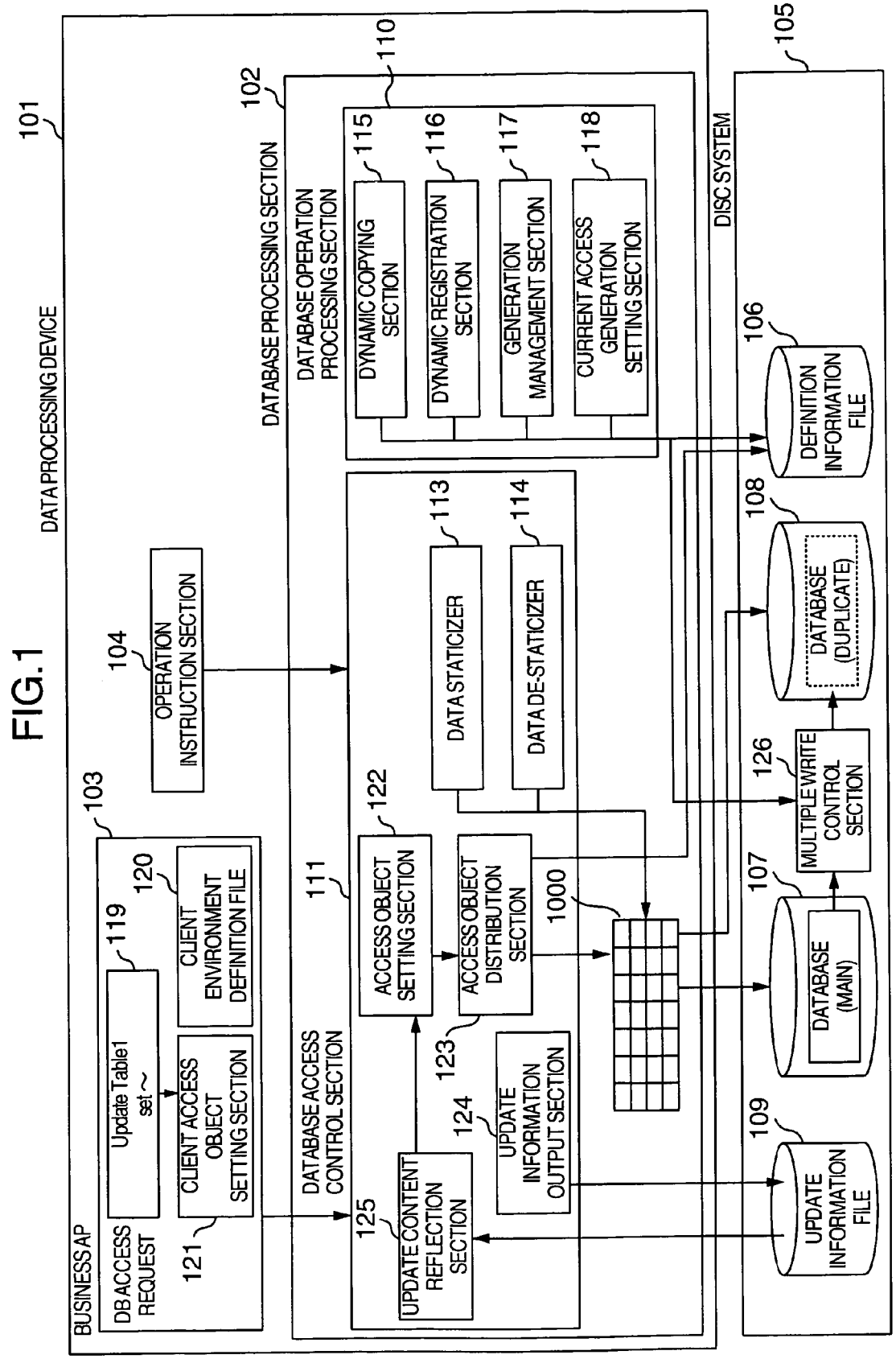
FIG. 1 shows an outline of a database processing device according to a present embodiment.

FIG. 1 shows an outline of a database processing system according to the present embodiment. As shown in FIG. 1, a database processing device 101 according to the present embodiment includes a database management processing section 102, an operation instruction section 104, a database operation processing section 110, a database access control section 111, a data staticizer 113, data de-staticizer 114, a dynamic copying section 115, a dynamic registration section, a generation management section 117, a current access generation setting section 118, an access object setting section 122, an access object distribution section 123, an update information output section 124, and an update content reflection section 125. These processing sections 102, 104, 110-125 may be hardware, programs, or objects where the respective processes are executed.

The database management processing section 102 receives a database access request from a program (business program and an application program) and the operation instruction section 104 and controls operation of each processing section so as to execute database search, update, and reorganization.

The operation instruction section 104 receives an execution instruction of a particular processing such as a database reorganization from a system administrator and instructs the database management processing section 102 to execute the particular processing. The database operation processing section 110 controls operations of the dynamic copying section 115, the dynamic registration section 116, the generation management section 117, and the current access generation setting section 118.

The database access control section 111 controls operations of the data staticizer 113, the data de-staticizer 114, the access object setting section 122, the access object distribution section 123, the update information output section 124, and the update content reflection section 125. The database access control section 111 performs switching of a main database and a duplicate database, executes a predetermined processing in the main database not to be operated, continues the database processing in the duplicate database, and reflects the update information file 109 on the main database.

The data staticizer 113 is a processing section for performing a processing to bring the main database to be operated and the duplicate database holding the copy of it into the quiescent mode and to bring the main database in which the update information is reflected and the duplicate database to be operated into the quiescent mode.

The data de-staticizer 114 releases the quiescent mode of the main database and the duplicate database. The dynamic copying section 115 is a processing section for copying the content of the main database onto the duplicate database. When the main database and the duplicate database holding its copy are defined for the data base, the dynamic registration section 116 registers the definition content into the definition information file 106.

The generation management section 117 is a processing section for managing the operation mode of the main database represented by a generation number "0" and the duplicate database represented by a generation number other than "0". The current access generation setting section 118 is a processing section for switching the database represented by "current" and to be operated from the main database to the duplicate database or from the duplicate database to the main database.

The current database is a database allowed to access from the aforementioned program.

The access object setting section 122 receives a request of accessing the database from the business AP 103 (program providing a business service or program and object accessing the database), the operation instruction section 104, or the update content reflection section 125 and sets the access object on the main database or the duplicate database according to the access request content.

The access object distribution section 123 distributes the access request to the database set by the access object setting section 122 so as to distribute the database access request from the business AP 103, the execution instruction such as reorganization from the operation instruction section 104, and the update information reflection request from the update content reflection section 125 to the main database or the duplicate database.

The update information output section 124 outputs to the update information file 109 the update information indicating the content of the update processing performed on the duplicate database as an operation object.

Here, the main database is a copy origin database of the duplicate database. The update information is history information including at least one of the addition, deletion, and updating of a record to/from/of the database. The update content reflection section 125 reflects the update information output to the update information file 109 to the main database where the aforementioned predetermined processing has been executed, by the parallel processing of a plurality of execution processes corresponding to the key value in the update information.

The program for functioning the database processing device 101 as the database management processing section 102, the operation instruction section 104, the database operation processing section 110, the database access control section 111, the data staticizer 113, the data de-staticizer 114, the dynamic copying section 115, the dynamic registration section 116, the generation management section 117, the current access generation setting section 118, the access object setting section 122, the access object distribution section 123, the update information output section 124, and the update content reflection section 125 is recorded in a recording medium such as a CD-ROM and stored on a magnetic disc, after which the program is loaded into a memory and is executed. It should be noted that the recording medium for recording the aforementioned program may be a recording medium other than the CD-ROM. Moreover, the program may be installed from the recording medium to an information processing device or the program may be used by accessing the recording medium via a network.

Moreover, the disc system 105 includes a multiple write control section 126 for copying the main database 107 to create the duplicate database 108 and reflecting (also referred to as mirroring process) or not reflecting the update content of the main database 107 on the duplicate database 108 according to the instruction from the magnetic disc device containing the definition information files 106, the main database 107, the duplicate database 108, and the update information file 109, and the dynamic copying section 115.

The duplicate database creation processing utilizes the processing such as MRCF and shadow image which are the volume copy function in the disc device.

Figure 2:
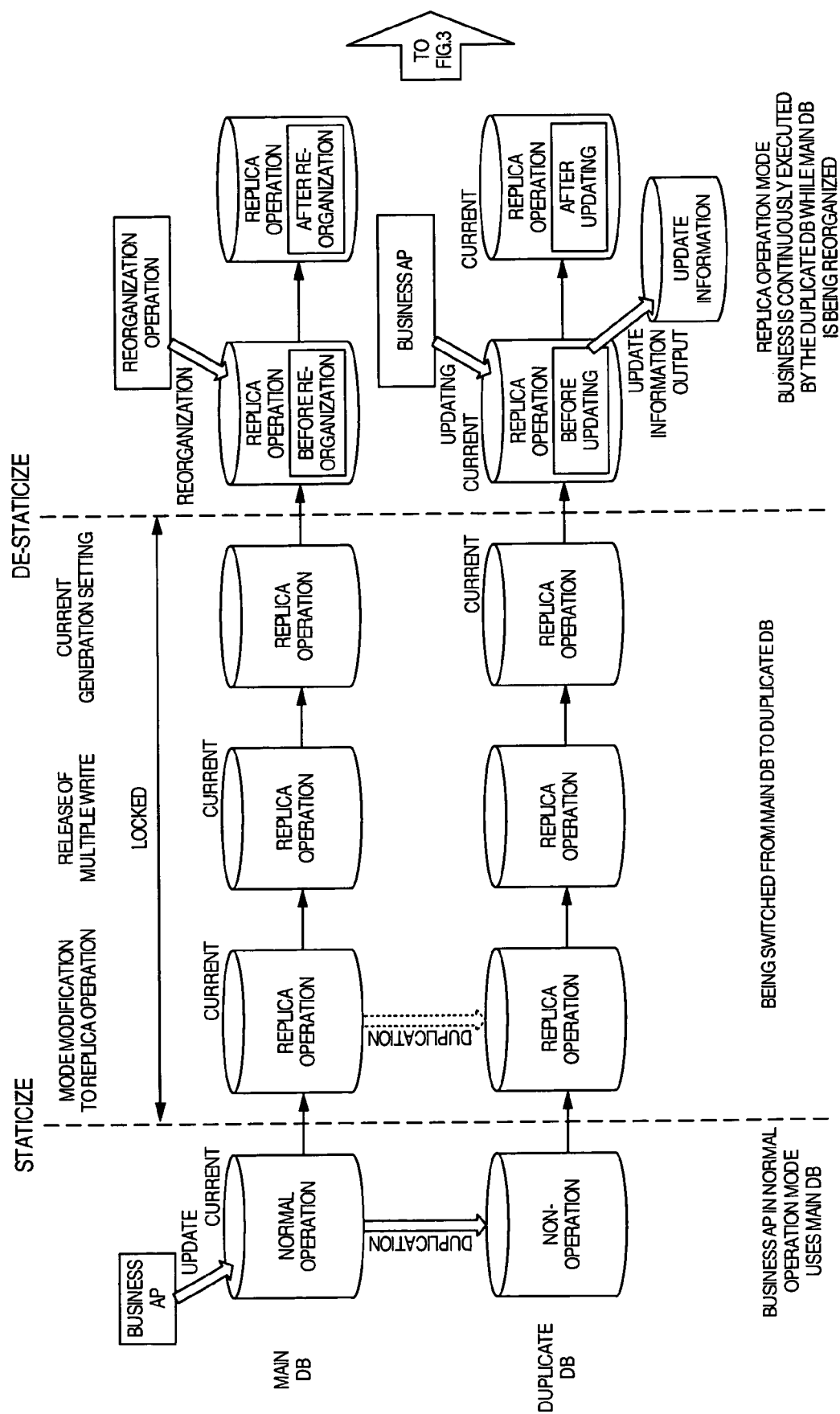
FIG. 2 shows an outline of mode transition reorganized during database processing execution by switching from the normal operation mode to the replica operation mode of the present embodiment.

FIG. 2 shows an outline of a mode transmission for reorganization during the database processing execution by switching from the normal operation mode to the replica operation mode according to the present embodiment. As shown in FIG. 2, in the database processing device according to the present embodiment, the access request by the business AP 103 is processed by the main database if in the normal operation mode, and the content of the main database is copied to the duplicate database by the multiple write control section 126. This multiple write processing may also be realized by the database processing section 102.

Here, when an instruction of a particular processing execution such as main database reorganization is input from the operation instruction section 104, the data staticizer 113 sets a lock mode for preventing execution of access processing to the database and outputting the data in the DB cache 1000 to the main database 107 (quiescent mode). Moreover, the generation management section 117 and the current access generation setting section 118 modify the mode of the DB definition information 1104 and the status content, releases the staticize by the data de-staticizer 114, and starts replica operation for switching the object to be operated from the main database to the duplicate database, thereby reorganizing the main database. The duplicate database outputs update information indicating the content of the update processing performed to the duplicate database by an access request processing from the business AP 103. The aforementioned reorganization processing and the access request processing may be executed in parallel and concurrently. Thus, by utilizing the quiescent mode, it is possible to switch the object to be operated from the main database to the duplicate database.

Thus, in the database processing device 101 of the present embodiment, the reorganization processing of the main database and the continuation of the database processing by the duplicate database are performed in parallel. Accordingly, when the main database should be subjected to a predetermined processing such as reorganization, the database processing can be executed even when a predetermined processing is being performed.

Figure 3:
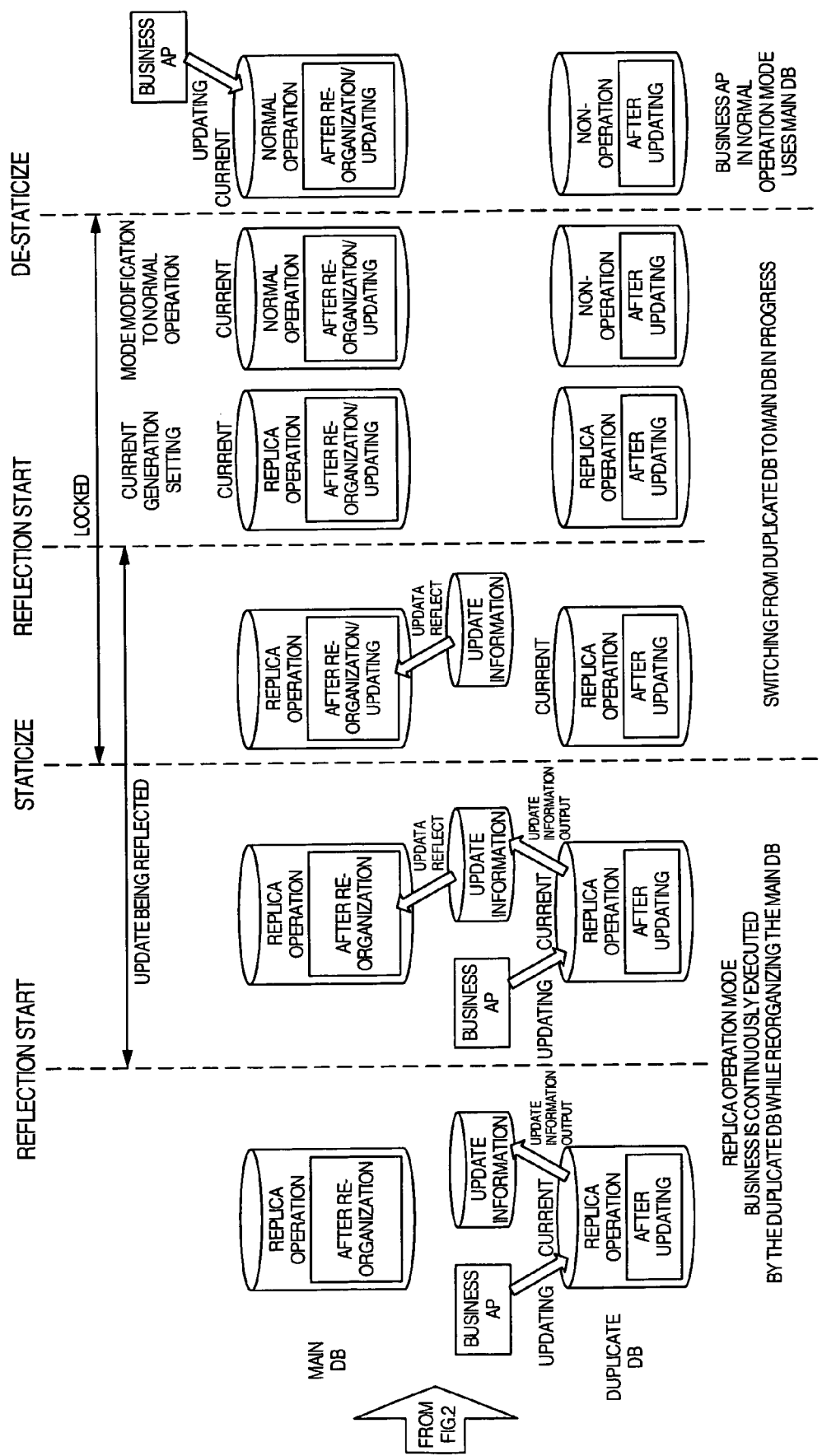
FIG. 3 shows an outline of the mode transition for returning from the replica operation mode to the normal operation mode after reorganization completion according to the present embodiment.

FIG. 3 shows an outline of the mode transition from the replica operation mode to the normal operation mode after the completion of reorganization in the present embodiment. As shown in FIG. 3, in the database processing device 101 of the present embodiment, when the reorganization of the main database is complete, the aforementioned update information output is reflected on the main database, after which the object to be operated is switched from the duplicate database to the main database, thereby completing the replica operation and resuming the normal operation by the main database.

In the aforementioned processing for reflecting the update information on the main database, the update information which has been output at the moment of the reflection is reflected on the main database, after which the main database and the duplicate database to be operated are made into a quiescent mode and the update information output after the reflection until the staticize is reflected on the main database, thereby reflecting the content of all the update processing performed for the duplicate database on the main database. It is also possible to set the quiescent mode when the number of the update information processes has reached the number of the remaining processes and reflect the update information on the main database. After this, the normal operation mode by the main database is set in. By such a processing, the processing history of the update processing to the duplicate database is provided as update information and it is possible to clarify the range of reflection on the main database.

Thus, in the database processing device 101 of the present embodiment, the reflection of update information on the main database and the continuation of the database processing by the duplicate database are executed in parallel and the staticize is performed after the reflection of the update information is complete. Accordingly, it is possible to reduce the time for waiting the access processing lock release.

Figure 4:
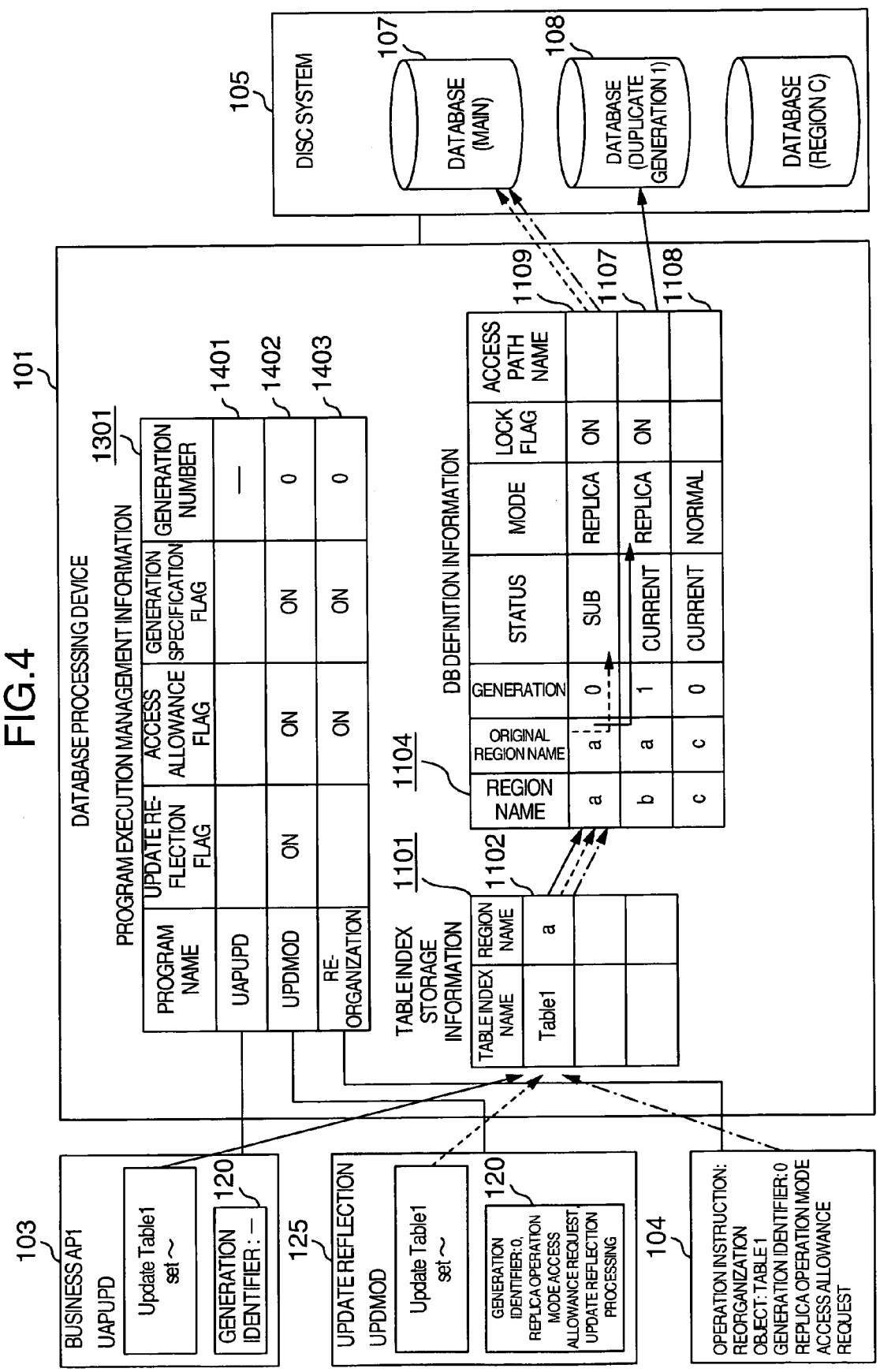
FIG. 4 shows an example program execution management information, table index storage information, and DB definition information according to the present embodiment.

FIG. 4 shows an example of program execution management information, table index storage information, and DB definition information according to the present embodiment. As shown in FIG. 4, the table index storage information 1101 of the present embodiment contains a table/index name indicating a table and index name processed by an access request from the business AP 103, the operation instruction section 104, or the update content reflection section 125 and the domain name of the database containing the tables and indexes.

Moreover, the DB definition information 1104 contains the domain name indicating the name of the domain as a substance of the database, the original domain name indicating the name of the domain in the main database, the generation indicating whether the database is a main database or a duplicate database, the status indicating whether the database is an object to be operated, the mode indicating the operation mode of the database, and the access path name indicating the name of the access path to the database.

The program execution management information 1301 contains the program name indicating the name of the program which has performed an access request, an update reflection flag indicating whether the program performs an update reflection request, an access allowing flag indicating whether access in the replica operation mode is allowed, a generation setting flag indicating whether a generation number is specified, and the generation number specified.

In the database processing device 101 of the present embodiment, when an execution instruction of a particular processing such as database reorganization is input by a system administrator, the operation instruction section 104 receives the execution instruction input and passes the name of the table to be subjected to the particular processing, the generation identifier of the database containing the table, a replica operation mode access allowance request requesting the allowance to access the database in the replica operation mode, and the operation instruction instructing the execution of the particular processing, to the database access control section 111.

Upon reception of an instruction to execute a particular processing from the operation instruction section 104, the database access control section 111 starts the replica operation with the duplicate database to be operated for the database as an object.

Figure 5:
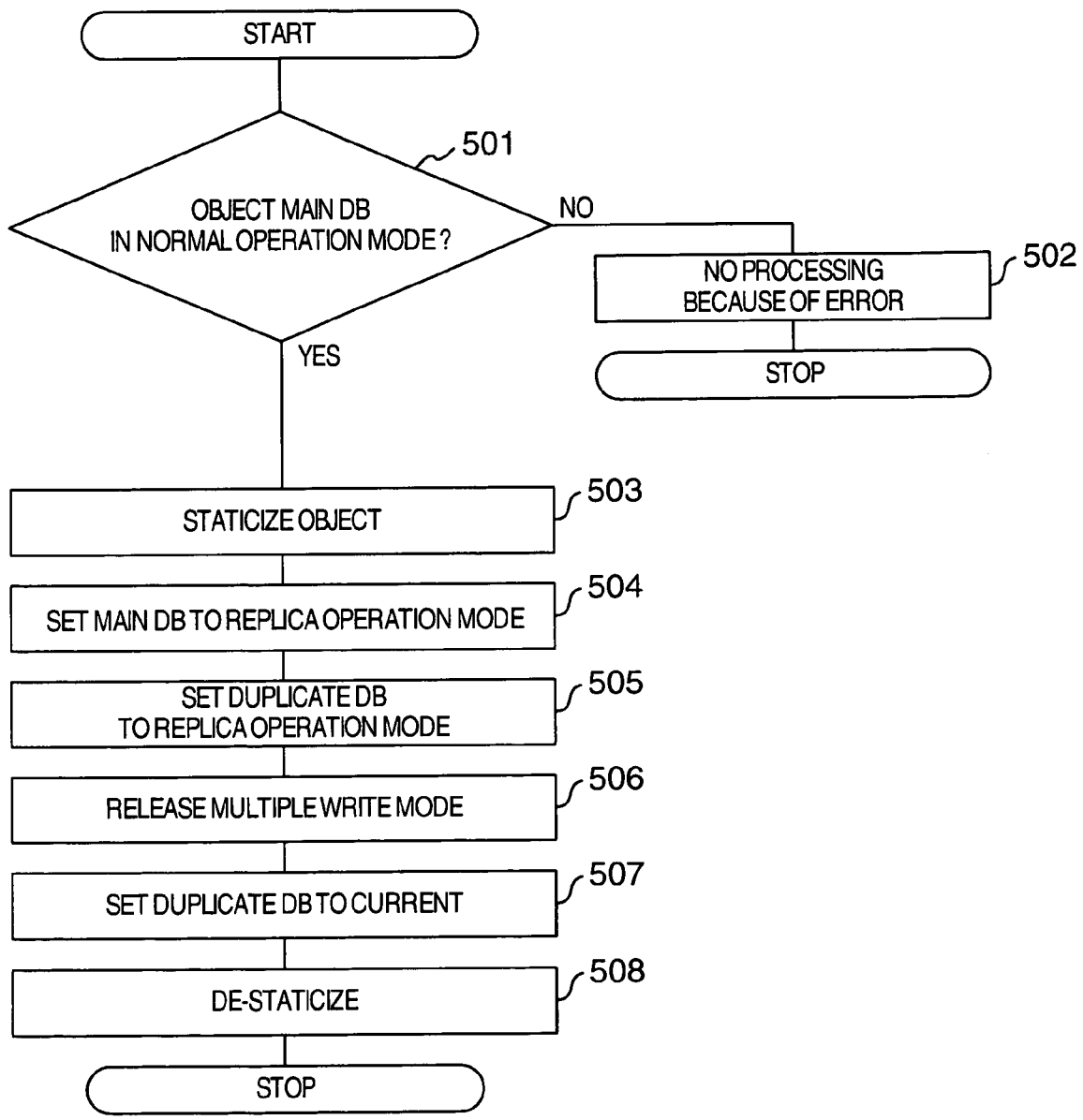
FIG. 5 is a flowchart showing a replica operation start processing procedure according to the present embodiment.

FIG. 5 is a flowchart showing a processing procedure of the replica operation start processing according to the present embodiment. In step 501, the database access control section 111 searches the table/index name of the table index storage information 1101 by using the table name received from the operation instruction section 104 and acquires a corresponding domain name. After this, the database access control section 111 searches from the DB definition information 1104 a record whose origin domain name coincides with the acquired domain name and whose generation is "0" and reads the mode in the record to judge whether the database to be processed is in the normal operation mode. If the judgement results in other than the normal operation mode, control is passed to step 502 and the processing is terminated as an error. If the judgement results in the normal operation mode, control is passed to step 503.

In step 503, the data staticizer 113 stores in a memory the information indicating that the main database to be processed and its duplicate database are in the quiescent mode, so that execution of the database processing for the main database to be operated is stopped and the main database and its duplicate database are staticized.

In step 504, the generation management section 117 sets information indicating the replica operation mode in the item of the record mode of the DB definition information 1104 searched and sets the main database in the replica operation mode.

In step 505, the generation management section 117 searches from the DB definition information 1104 a record whose origin domain name coincides with the acquired domain name and whose generation is other than "0", sets information indicating the replica operation mode in the item of the record mode searched, and sets the duplicate database to a replica operation mode.

In step 506, the database access control section 111 instructs the multiple write control section 126 of the disc system 105 to release the multiple write mode which is a mode for copying the content of the main database into the duplicate database.

In step 507, the current access generation setting section 118 sets "sub" indicating other than the database to be operated, in the status item in the record of the main database searched by the DB definition information 1104, sets "current" indicating a database to be operated, in the status item in the record of the duplicate database, and switches the database to be operated from the main database to the duplicate database.

In step 508, the data de-staticizer 114 deletes the information indicating the quiescent mode stored in the memory and releases the quiescent mode of the main database and the duplicate database.

As has been described above, when the replica operation is started, the database access control section 111 subjects the main database not to be operated to a particular processing such as reorganization instructed from the operation instruction section 104 and in parallel with this, continues the database processing in the duplicate database. Moreover, when the duplicate database to be operated is subjected to update processing, the update information output section 124 outputs the update information indicating the content of the update processing to the update information file 109. When the particular processing of the main database is complete, the database access control section 111 terminates the replica operation and performs processing to return to the normal operation mode.

Figure 6:
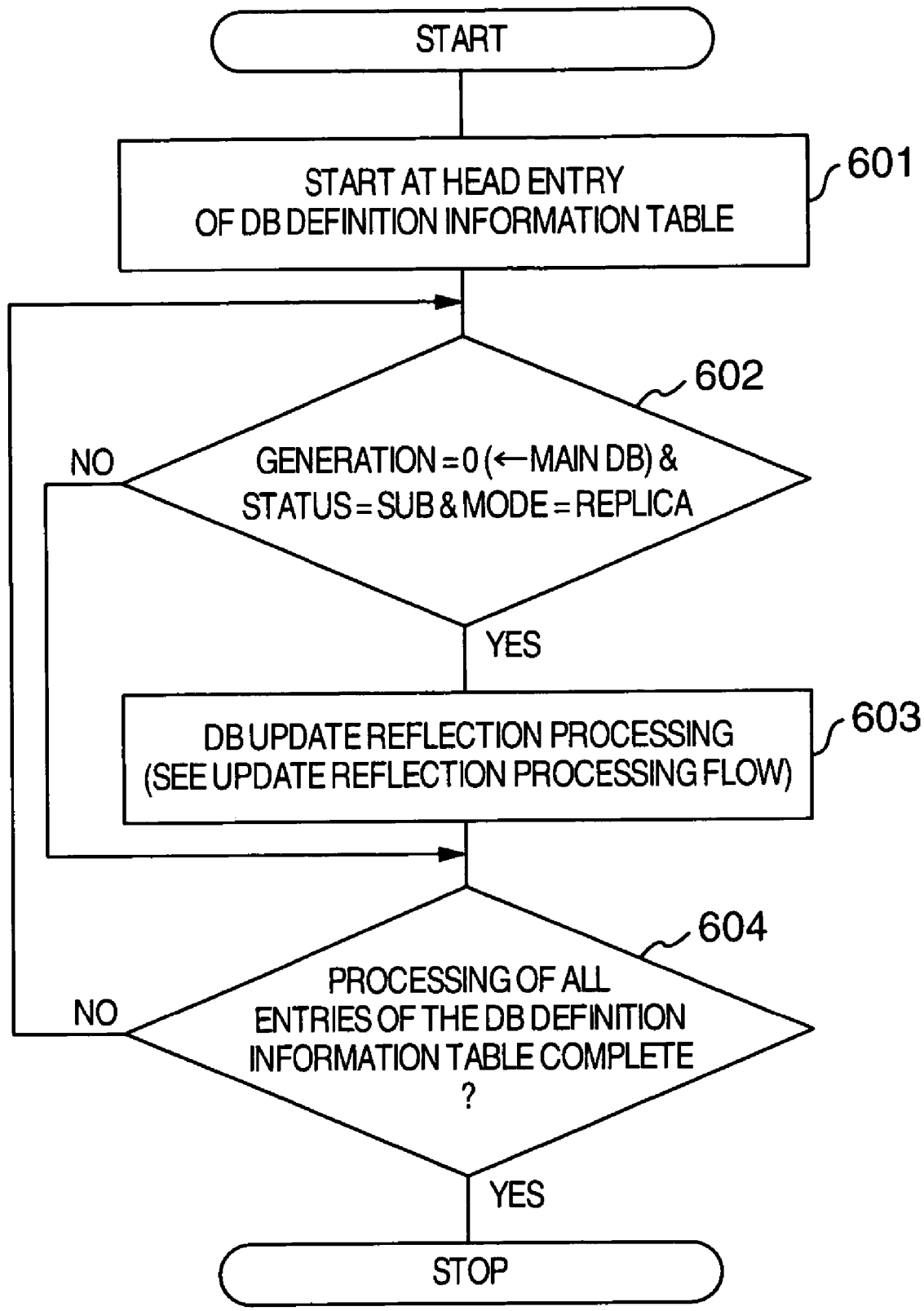
FIG. 6 is a flowchart showing a replica operation end processing procedure according to the present embodiment.

FIG. 6 is a flowchart showing a processing procedure of the replica operation end processing according to the present embodiment. In step 601, the database access control section 111 reads out a record from the first entry of the DB definition information 110-4 and control is passed to step 602.

In step 602, if the generation inn the record read out is "0" and the status is "sub" and the mode is "replica", i.e., if the record is a record of the main database where the particular processing has been executed in the replica operation mode, control is passed to step 603.

In step 603, the update content reflection section 125 reflects the update information output to the update information file in the main database where the predetermined processing has been executed, by executing in parallel a plurality of execution processes corresponding to the key value in the update information.

In step 604, the database access control section checks whether processes of all the entries in the DB definition information 1104 are complete. Unless processes of all the entries are complete, the record of the next entry is read out and control is returned to step 602. If processes of all the entries are complete, the replica operation end processing is terminated.

Figure 7:
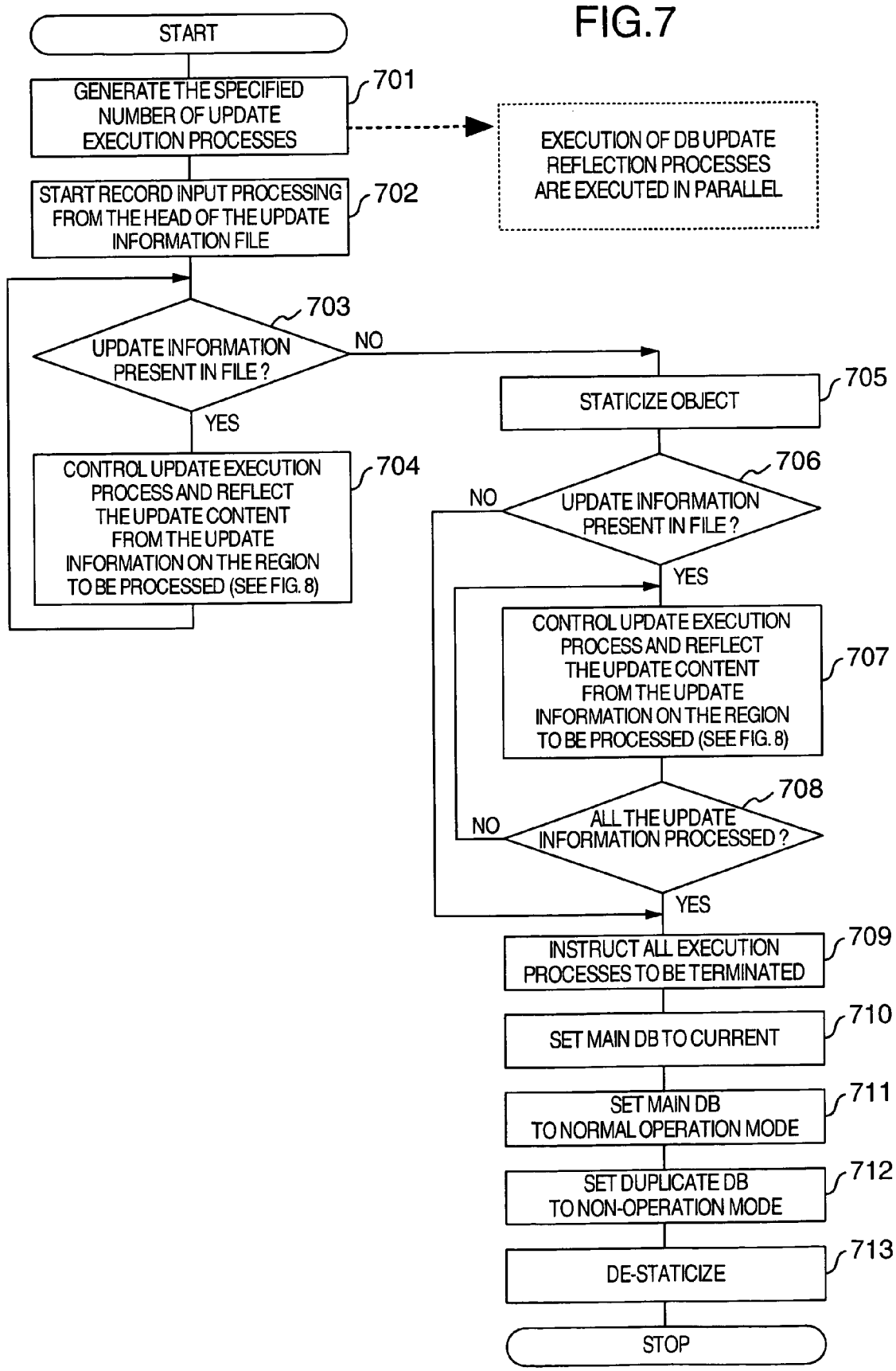
FIG. 7 is a flowchart showing a DB update reflection processing procedure of step 603 according to the present embodiment.

FIG. 7 is a flowchart showing a processing procedure of the DB update reflection processing of step 603 in the present embodiment. In step 701, the update content reflection section 125 generates the number of update execution processes specified in advance by the system definition or the like.

In step 702, a record is read out from the head of the update information file 109 and control is passed to step 703. In step 703, the read out result of the record is checked to determine whether update information is present in the update information file 109. If update information is present, control is passed to step 704. Otherwise, control is passed to step 705.

In step 704, the update execution process is controlled so as to reflect the update information in the main database by the update information of the region to be processed.

In step 705, the data staticizer 113 stores in a memory the information indicating that the main database and its duplicate database are in the quiescent moded, so as to stop execution of the database processing for the duplicate database to be operated and set the main database and its duplicate database to the quiescent mode.

In step 706, a record is read out from the update information file 109 and the read out result is checked to determine whether update information is present in the update information file 109. If the update information is present, control is passed to step 707. In step 707, the update execution process is controlled-to reflect the update content by the update information of the region to be processed.

In step 708, a record is read out from the update information file 109 and the read out result is checked to determine whether all the update information processes have been completed. Unless all the update information processes are complete, control is returned to step 707. If all the update information processes are complete, control is passed to step 709. In step 709, all the execution processes generated in step 701 are instructed to be terminated.

In step 710, the current access generation setting section 118 searches the DB definition information 1104, sets "current" indicating the database to be operated in the status item in the record of the main database, sets "sub" indicating the database not to be operated in the status item in the record of the duplicate database, and switches the database to be operated from the duplicate database to the main database.

In step 711, the generation management section 117 sets information indicating the normal operation mode in the item of the record mode of the main database searched and sets the main database into the normal operation mode.

In step 712, the generation management section 117 sets information indicating the non-operation mode in the item of the record mode of the duplicate database searched and sets the duplicate database into the non-operation mode.

In step 713, the data de-staticizer 114 deletes the information indicating the quiescent mode stored in the memory and releases the quiescent mode of the main database and the duplicate database.

Figure 8:
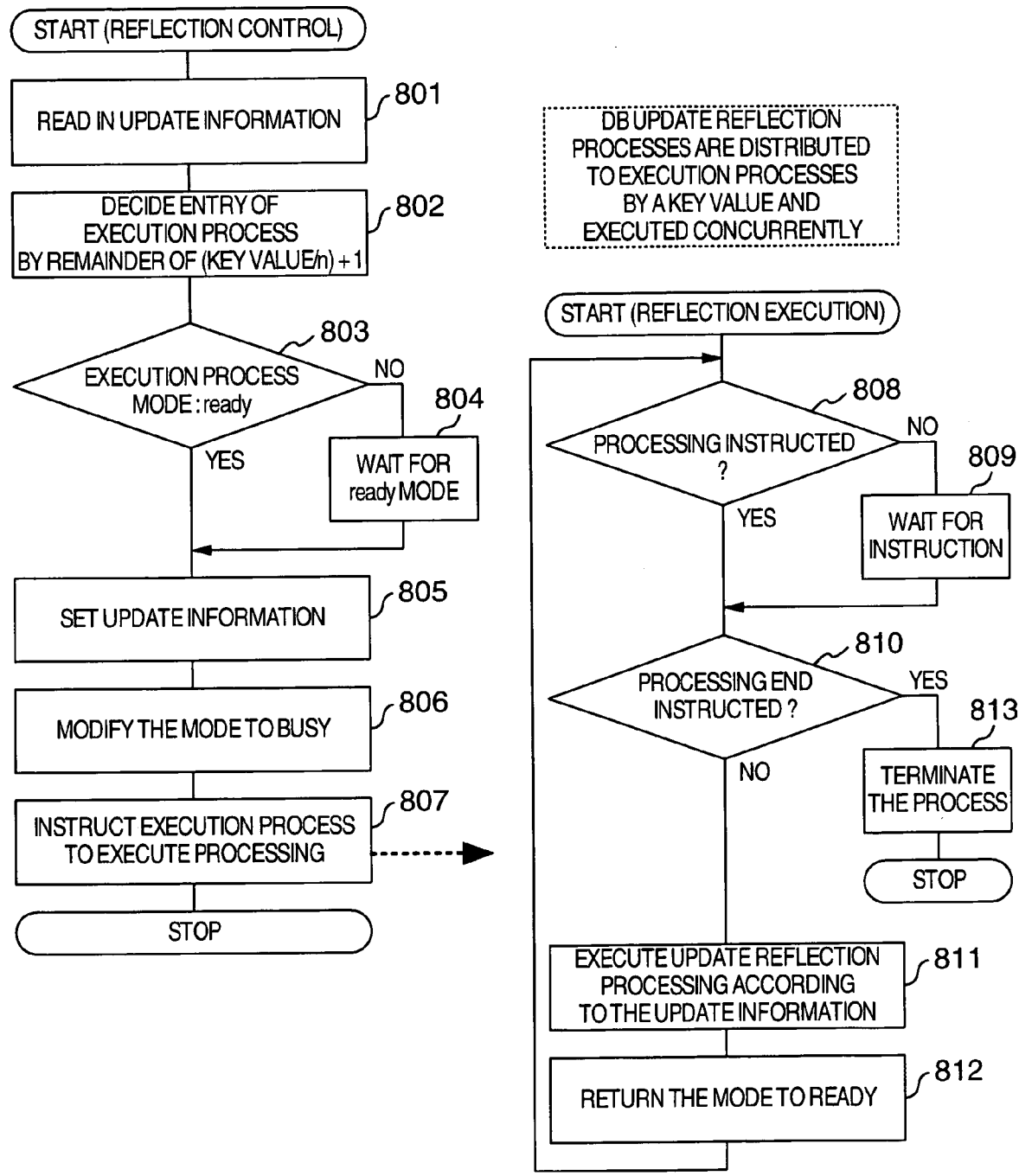
FIG. 8 is a flowchart showing a procedure of a reflection control processing of step 704 and a reflection execution processing of the update processing execution process according to the present embodiment.

FIG. 8 is a flowchart showing a processing procedure of the reflection control processing and reflection execution of the update execution process of step 704. In step 801, the update content reflection section 125 reads in the key value of the database record which has been updated from the update information in the record which has been read out.

In step 802, the entry of the execution process management table is decided by the value obtained as follows. The key value read in is divided by the number of update execution processes and the obtained remainder is added by "1". The value thus obtained decides the entry.

In step 803, the execution process mode of the decided entry is read out from the execution process management table. If the mode is other than ready, control is passed to step 804 for waiting until the mode becomes ready.

In step 805, the update information in the record which has been read out is set in the update information of the decided entry. In step 806, the mode of the decided entry is modified to busy. In step 807, reflection execution is instructed to the execution process identified by the process number of the entry decided.

In step 808, the update execution process checks whether processing instruction has been received from the update content reflection section 1125. If the process instruction has not been received, control is passed to step 809 for waiting for the instruction.

In step 810, the instruction content received from the update content reflection section 125 is checked. If the instruction is other than the instruction of processing end, control is passed to step 811. If the instruction is for the processing end, control is passed to step 813.

In step 811, the execution process management table is referenced and the update reflection processing is executed according to the update information stored in the entry of the update processing execution process. In step 812, the mode in the entry is returned to ready. On the other hand, in step 813, the processing of the update execution process is terminated.

When the update reflection processing is started by the update execution process as has been described above, the access processes are distributed according to the access object.

Figure 9:
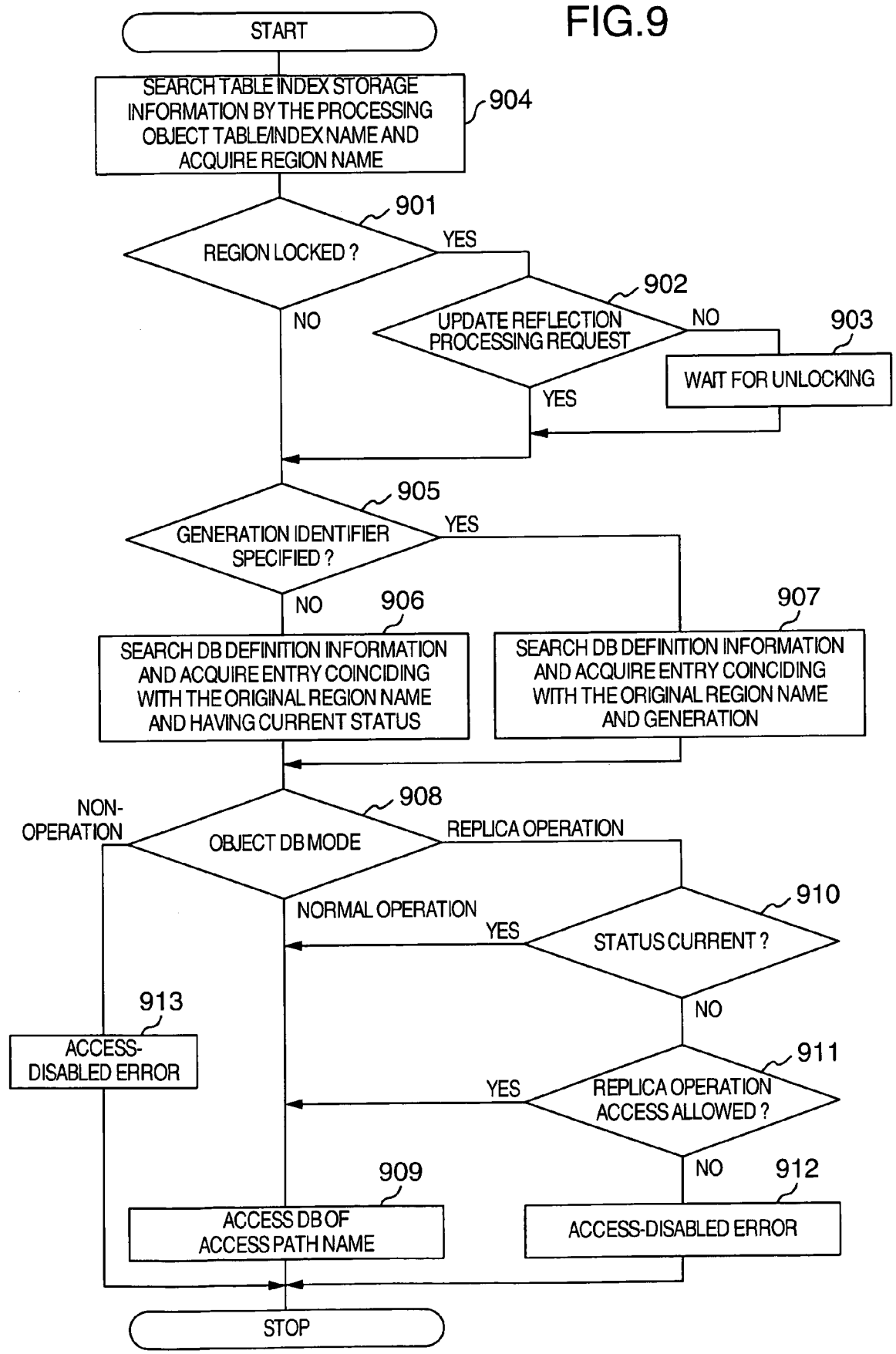
FIG. 9 is a flowchart showing a procedure of a an access object distribution process and access process according to the present embodiment.

FIG. 9 is a flowchart showing a processing procedure of the access object distribution and the access processing according to the present embodiment. In step 904, the table name in the access request is used to search a table/index name of the table index storage information 1101 and a corresponding domain name is acquired. In step 901, when the access object setting section 122 receives a database access request from the business AP 103, the operation instruction section-104, or the update content reflection section 125, the access object setting section 122 checks whether the information indicating that the database to be accessed by the access request is in a quiescent mode is stored in a memory and checks whether the database is locked (in quiescent mode). If it is locked, control is passed to step 902.

In step 902, the update reflection flag corresponding to the name of the program which has made the access request is read out from the program execution management information 1301 and checked whether it is an update reflection request (update reflection flag is ON). If the access request is not the update reflection request, control is passed to step 903 for waiting for lock release.

Step 905 checks whether specification of the generation identifier is present in the access request. If no specification of the generation identifier is present, control is passed to step 906. If specification of the generation identifier is present, control is passed to step 907.

Step 906 searches the DB definition information 1104 and acquires an entry in which the acquired domain name coincides with the original domain name and the status is "current". Moreover, step 907 searches the DB definition information 1104 and acquires an entry in which the acquired domain name coincides with the original domain name and the specified generation identifier coincides with the generation.

In step 908, the access object distribution section 123 references the mode in the entry thus obtained. If the database mode is a normal operation mode, control is passed to step 909. If the database mode is a replica operation mode, control is passed to step 910. If the database mode is a non-operation mode, control is passed to step 913.

Step 909 reads out the access path name in the entry and executes the access processing to the database according to the access path.

Step 910 checks whether the status in the entry is "current". If "current", control is passed to step 909. Otherwise, control is passed to step 911.

Step 911 reads out the access allowing flag corresponding to the name of the program which has made the access request from the program execution management information 1301 and judges whether the access request is one allowed to access in the replica operation mode (access allowing flag is ON). If the access is allowed in the replica operation mode, control is passed to step 909. Otherwise control is passed to step 912.

In step 912, an error is caused disabling access. Moreover, in step 913 also, an error is caused disabling access.

FIG. 10 shows an example of record format of the update information according to the present embodiment. As shown in FIG. 10, the update information of the present embodiment contains the domain name of the duplicate database where the update processing is performed, the table name updated, the key value for identifying the database record where update processing is performed, the processing type indicating the update processing type, and the update data used for the update processing.

FIG. 11 is an example of the execution process management table format of the update reflection processing according to the present embodiment. As shown in FIG. 11, the execution process management table of the present embodiment contains the process number as information for identifying the update execution process (program and object), the processing mode indicating the mode of the process, and the update information used for the reflection processing by the process.

As has been described above, in the database processing device according to the present embodiment, the database processing is continued by switching the operation object to a plurality of databases, a predetermined processing is executed to the main database, and the update processing performed to the duplicate database is reflected to the main database which has been subjected to the predetermined processing, after which the operation object is returned to the main data base. Accordingly, when it is necessary to perform a predetermined processing to the main database, the predetermined processing can be performed while continuing the database processing.

According to the present invention, when it is necessary to perform a predetermined processing to a database, it is possible to execute the database processing and the predetermined processing in parallel and concurrently.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A data processing method comprising steps of:
copying data from a first database to a second database while allowing access to the first database by a program during the copying, such that the second database is a duplicate of the first database as a result of the copying;
as a result of an input designating reorganization of the first database, switching a program access allowance from the first database to the second database and allowing the program to access the second database in place of the access to the first database;
after switching the program access allowance, storing a history of a processing of the program to the second database as a processing history and executing the reorganization of the first database in parallel with the accessing of the program to the second database, the processing history being stored during the execution of the reorganization, and the processing history being stored on a storage system in which the first database and the second database are stored;
upon completion of the reorganization of the first database, updating the first database based on the processing history stored during the reorganization;
upon completion of the updating of the first database based on the processing history stored, switching the program access allowance from the second database to the first database and allowing the program to again access the first database in place of the access to the second database;
determining whether access to the first database in a replica operation mode is allowed for the program seeking the access, based on a condition of a replica operation of the first database; and
if it is determined that access to the first database in a replica operation mode is allowed for said program, executing said access to the first database in the replica operation mode in parallel with the accessing of the program to the second database, but if it is determined that access to the first database in a replica operation mode is not allowed for said program, causing an error and disabling access to the first database;
wherein the replica operation mode is a mode in which the program access allowance has been switched from the first database to the second database;
wherein said step of determining whether access to the first database in a replica operation mode is allowed includes a step of reading a dynamic access allowance flag from a table using the name of the program seeking the access as a key; and
wherein the access allowance flag indicates whether access to the first database is allowed for the program seeking the access.

2. A data processing device comprising:
means for copying data from a first database to a second database while allowing access to the first database by a program during the copying, such that the second database is a duplicate of the first database as a result of the copying;
means for switching a program access allowance from the first database to the second database as a result of an input designating reorganization of the first database, and allowing the program to access the second database in place of the access to the first database;
means for storing a history of a processing of the program to the second database as a processing history and executing the reorganization of the first database in parallel with the accessing of the program to the second database after switching the program access allowance, the processing history being stored during the execution of the reorganization, and the processing history being stored on a storage system in which the first database and the second database are stored;
means for updating the first database, based on the processing history stored during the reorganization, upon completion of the reorganization of the first database;
means for switching the program access allowance from the second database to the first database upon completion of the updating of the first database based on the processing history stored, and allowing the program to again access the first database in place of the access to the second database;
means for determining whether access to the first database in a replica operation mode is allowed for the program seeking the access, based on a condition of a replica operation of the first database;
means, if it is determined that access to the first database in a replica operation mode is allowed for said program, for executing said access to the first database in the replica operation mode in parallel with the accessing of the program to the second database; and
means, if it is determined that access to the first database in a replica operation mode is not allowed for said program, for causing an error and disabling access to the first database;
wherein the replica operation mode is a mode in which the program access allowance has been switched from the first database to the second database;
wherein said means for determining whether access to the first database in a replica operation mode is allowed includes means for reading a dynamic access allowance flag from a table using the name of the program seeking the access as a key; and
wherein the access allowance flag indicates whether access to the first database is allowed for the program seeking the access.

3. A computer-readable recording medium storing a data processing program comprising codes, wherein the data processing program, when executed on a data processing device, causes the data processing device to perform a method comprising the steps of:
copying data from a first database to a second database while allowing access to the first database by a program, and, as a result of an input designating reorganization of the first database, switching a program access allowance from the first database to the second database and allowing the program to access the second database in place of the access to the first database;

after switching the program access allowance, storing a history of a processing of the program to the second database as a processing history and executing the reorganization of the first database in parallel with the accessing of the program to the second database, the processing history being stored during the execution of the reorganization, and the processing history being stored on a storage system in which the first database and the second database are stored;

upon completion of the reorganization of the first database, updating the first database based on the processing history stored during the reorganization;

upon completion of the updating of the first database based on the processing history stored, switching the program access allowance from the second database to the first database and allowing the program to again access the first database in place of the access to the second database;

determining whether access to the first database in a replica operation mode is allowed for the program seeking the access, based on a condition of a replica operation of the first database; and if it is determined that access to the first database in a replica operation mode is allowed for said program, executing said access to the first database in the replica operation mode in parallel with the accessing of the program to the second database, but if it is determined that access to the first database in a replica operation mode is not allowed for said program, causing an error and disabling access to the first database;

wherein the replica operation mode is a mode in which the program access allowance has been switched from the first database to the second database;

wherein said step of determining whether access to the first database in a replica operation mode is allowed includes a step of reading a dynamic access allowance flag from a table using the name of the program seeking the access as a key; and wherein the access allowance flag indicates whether access to the first database is allowed for the program seeking the access.

* * * * *